United States Patent
Peshina

(10) Patent No.: US 8,491,688 B2
(45) Date of Patent: Jul. 23, 2013

(54) WIRE CAGE FOR A FILTER BAG

(76) Inventor: William F. Peshina, North Royalton, OH (US)

( * ) Notice: Subject to any disclaimer, the term of this patent is extended or adjusted under 35 U.S.C. 154(b) by 0 days.

(21) Appl. No.: 12/680,599

(22) PCT Filed: Sep. 25, 2008

(86) PCT No.: PCT/US2008/011085
§ 371 (c)(1),
(2), (4) Date: Mar. 29, 2010

(87) PCT Pub. No.: WO2009/042161
PCT Pub. Date: Apr. 2, 2009

(65) Prior Publication Data
US 2010/0223895 A1    Sep. 9, 2010

Related U.S. Application Data

(60) Provisional application No. 60/960,423, filed on Sep. 28, 2007.

(51) Int. Cl.
*B01D 46/00* (2006.01)
(52) U.S. Cl.
USPC .............................................. 55/379; 55/492

(58) Field of Classification Search
USPC ...... 55/334, 341.1–341.7, 361–382, 490–520
See application file for complete search history.

(56) References Cited

U.S. PATENT DOCUMENTS

| | | | | |
|---|---|---|---|---|
| 3,747,307 | A | * | 7/1973 | Peshina et al. ................. 55/379 |
| 3,787,142 | A | * | 1/1974 | Dupke ...................... 416/247 R |
| 4,324,571 | A | * | 4/1982 | Johnson, Jr. ................... 55/302 |
| 5,278,740 | A | * | 1/1994 | Agnelli ........................ 362/649 |
| 6,910,787 | B2 | * | 6/2005 | Thome et al. ................ 362/376 |
| 7,905,935 | B2 | * | 3/2011 | Clements .................... 55/341.1 |
| 7,927,392 | B2 | * | 4/2011 | Clements et al. ............ 55/341.1 |
| 2004/0134170 | A1 | * | 7/2004 | Pipkorn et al. ................. 55/379 |
| 2005/0205484 | A1 | * | 9/2005 | Diel ........................... 210/323.1 |
| 2010/0269466 | A1 | * | 10/2010 | Peshina et al. ................. 55/490 |

* cited by examiner

*Primary Examiner* — Duane Smith
*Assistant Examiner* — Thomas McKenzie
(74) *Attorney, Agent, or Firm* — William H. Holt

(57) ABSTRACT

An elongated wire cage 3 for insertion in to a known type of fabric filter (not shown) includes a pair of cage sections 6 and 8 secured together by a pair of couplers 6 and 8 attached to respective adjacent ends of the cage sections and having compatible flanges 10, 12, 14 and 16 for securing the cage sections together thus forming the elongated cage 3.

2 Claims, 2 Drawing Sheets

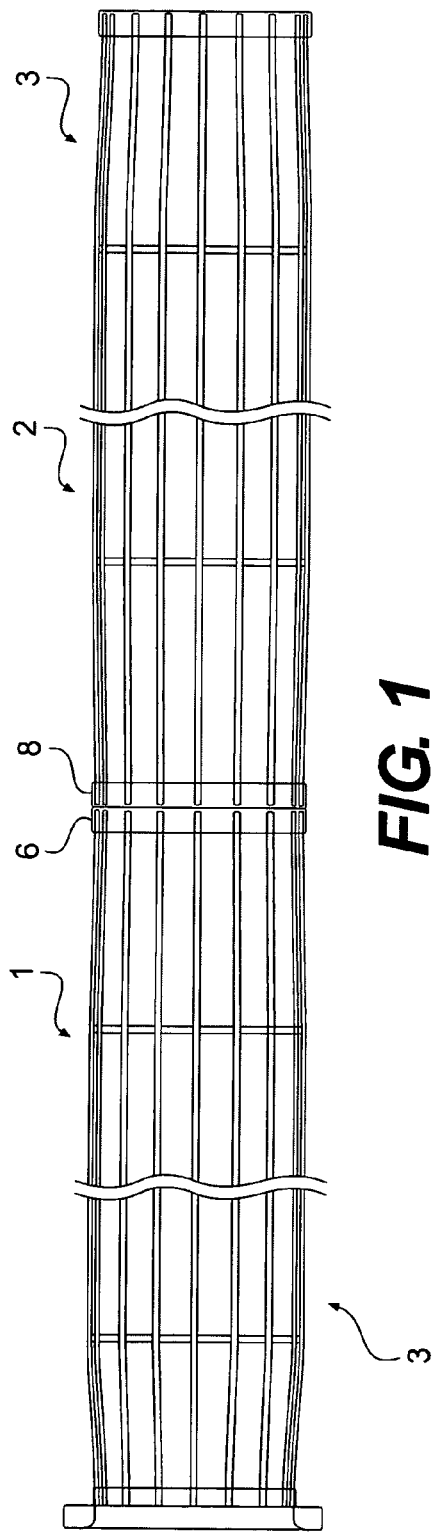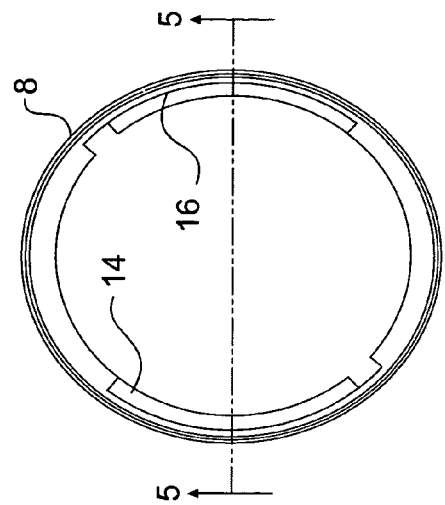

WIRE CAGE FOR A FILTER BAG

Priority is claimed from U.S. Provisional Application Ser. No. 60/960,423, filed on Sep. 28, 2007, and the information therefrom is incorporated herein by reference.

BACKGROUND OF THE INVENTION

It is a well known and standard practice for industry to remove particulate matter from a flowing stream of fluid by passing the fluid through a filter that entraps the particulates. More particularly, gases that contain smoke, soot and other particulates created by processes such as combustion of fossil fuels and the like, have been passed through woven or unwoven fabric filters for cleaning such gases prior to further treatment of such gases, or exhausting such gases to the atmosphere. Such filters may be referred to as "fabric filters", or "bag filters", and a plurality of such filters are used to provide "dust collectors" or "bag houses", in which hundreds, or thousands, of such filter are used for filtering huge flows of contaminated gases.

Heretofore, tubular shaped fabric filters, i.e., filter bags, have been provided with a wire cage placed therein for maintaining the filter in an open condition for allowing gases to pass therethrough while trapping particulates on a surface thereof.

In the past, it has been traditional that such filter bags, and wire cages had various designed lengths in a range of up to approximately 12 to 14 feet (+/−3 to 4 meters), and a large filtering system, i.e., a bag house, might contain between 3,000 and 5,000 filter bags and related cages. A typical example of a prior art filter cage is shown in U.S. Pat. No. 6,905,529 granted on Jun. 14, 2005.

SUMMARY OF THE INVENTION

Modern day filter systems, i.e., bag houses containing fabric filters equipped with wire cages, are being designed for having units of filter bags and wire cages with lengths on the order of up to ten (10) meters in length and having, perhaps, as many as 30,000 of such units in a single installation.

It has been deemed advisable that such foregoing systems include wire cages that are provided in a plurality of sections having a lesser length than a full length of 10 meters for simplifying manufacture, storage, shipping and installation of such cages, and that such sections include means for connecting and/or locking the sections together during installation and for allowing easy separation of, and re-connection of, the cage sections during maintenance operations such as changing and/or repairing worn filter bags.

The present invention successfully provides for connecting together two or more sections of wire cages to provide a desired length and including means for locking and unlocking adjacent sections for forming a rigid, interlocking structure which enhances and retains true, longitudinal straightness of the assembled sections.

BRIEF DESCRIPTION OF THE DRAWINGS

FIG. 1 illustrates a pair of elongated, tubular wire cage sections for a filter bag, the two sections being joined and secured to each other by a pair of couplers.

FIG. 2 is an end view of a first coupler having a pair of radially inwardly extending arcuate flanges.

FIG. 3 is an end view of a second coupler having a pair of radially outwardly directed reversely bent arcuate flanges.

DESCRIPTION OF THE PREFERRED EMBODIMENTS

Figure 4:
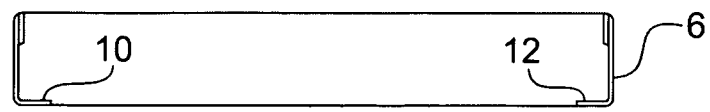
FIG. 4 is a sectional view of the first coupler taken on line 4-4 of FIG. 2.

As is illustrated in FIG. 1, the invention is comprised of a plurality of wire cage sections generally indicated by the numerals 1 and 2 that are connected together at adjacent ends for forming an elongated cage 3 to be inserted into a woven or non-woven, elongated, tubular filter bag (not shown) of a type well known in the prior art.

The invention is particularly related to a pair of generally circular first coupler 6 and second coupler 8 attached to respective adjacent ends of cage sections 1 and 2 that are securely held together by couplers 6 and 8 in a manner to be hereinafter described.

First coupler 6 is shown in FIGS. 2 and 4 and includes a pair of radially inwardly extending, arcuate flanges 10 and 12. The two flanges 10 and 12 are shown as being preferably diametrically opposed from each other but it is to be understand that the invention may be practiced by using a single flange, or more than two flanges spaced about the circumference of coupler 6.

Figure 5:
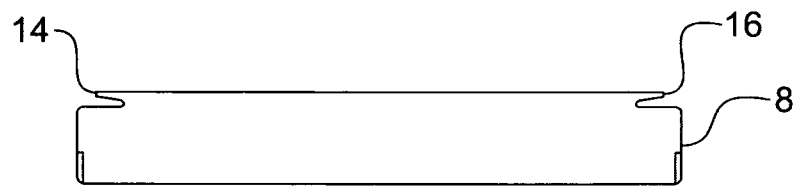
FIG. 5 is a sectional view of the second coupler taken on line 5-5 of FIG. 3.

Second coupler 8 is shown in FIGS. 3 and 5 and includes a pair of radially outwardly directed reversely bent arcuate flanges 14 and 16. Upon mating of couplers 6 and 8, relative rotation will cause flanges 14 and 16 to overlie flanges 10 and 12 to provide an inter-connection for the two adjacent cage sections 1 and 2 thereby providing the elongated cage 3 as is shown in FIG. 1.

Figure 6:
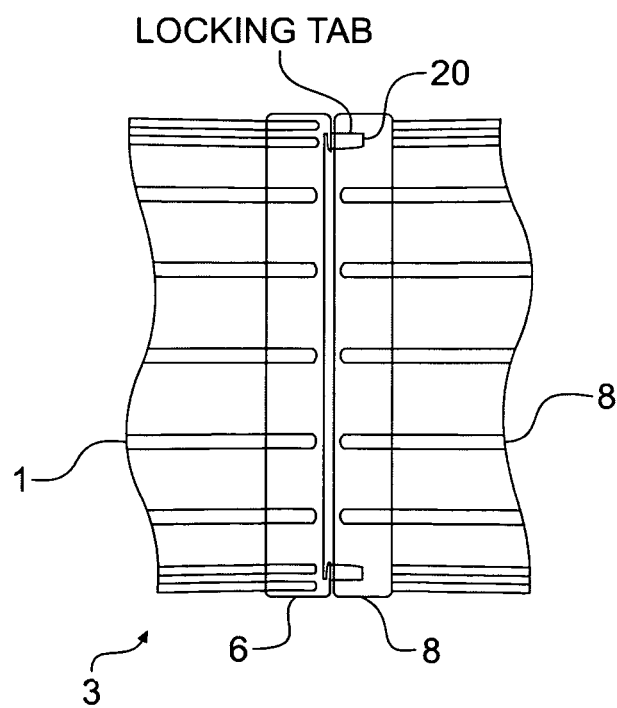
FIG. 6 is a fragmentary view showing the first and second couplers in assembled condition provided with a locking tab to preclude relative rotation of the assembled wire cages.

FIG. 6 is a fragmentary view of cage sections 1 and 2 connected together by coupler 6 and coupler 8. A locking pin, or ring, or tab 20, may be inserted, for example, through aligned openings or holes in the flanges 10 or 12 and 14 or 16 for precluding inadvertent, relative rotation of the adjacent cages during use.

In view of the foregoing descriptions and the accompanied drawings, the best mode of the invention has been disclosed and the features thereof will be understood by persons of ordinary skill in the related art. It is to be understood however that the foregoing descriptions are by way of illustration, and the invention is not necessarily limited thereto. Modifications and variations will be apparent from the disclosure and may be resorted to without departing from the spirit of the invention as those of skill in the art will readily understand. Accordingly, such variations and modifications are considered to be within the purview and scope of the invention as defined in the following claimed subject matter.

I claim:

1. An elongated tubular cage (3) having an open structure for supporting a fabric filter in open position for allowing particulate laden fluids to pass therethrough for separating said particulate from said fluid; said elongated tubular cage being comprised of at least a pair of cage sections including a first tubular cage section (1) and a second tubular cage section (2), a first generally circular coupler (6) attached to an end of said first tubular cage section (1) and a second generally circular coupler (8) attached to an end of said second tubular cage section (2), said first coupler (6) and said second coupler (8) comprising means for securing said cage sections together for forming said elongated tubular cage (3), characterized in that said first generally circular coupler (6) includes a pair of diametrically opposed radially inwardly directed arcuate flanges (10,12) and said second generally circular coupler (8) includes a pair of diametrically opposed radially outwardly directed reversely bent arcuate flanges (14,16), and wherein said cage sections (1, 2) are connected together for forming said elongated tubular cage (3) by mating said first and second generally circular couplers and rotating them relative to each other for moving said pair of outwardly directed reversely bent arcuate flanges (14,16) to overlie said pair of inwardly directed flanges (10,12).

2. An elongated tubular cage as defined in claim 1 further including a locking tab (20) disposed within aligned openings in the overlying flanges for securing said first coupler to said second coupler for precluding relative rotation thereof.

\* \* \* \* \*